US011475398B2

(12) United States Patent
Luzada et al.

(10) Patent No.: US 11,475,398 B2
(45) Date of Patent: Oct. 18, 2022

(54) PRODUCT TRACEABILITY PROCESSING

(71) Applicant: NCR Corporation, Duluth, GA (US)

(72) Inventors: Rex Luzada, Oslob (PH); Dindo Capistrano, Maasin (PH); Juvilyn M. Porol, Kasambagan (PH)

(73) Assignee: NCR Corporation, Atlanta, GA (US)

(*) Notice: Subject to any disclaimer, the term of this patent is extended or adjusted under 35 U.S.C. 154(b) by 1154 days.

(21) Appl. No.: 15/993,487

(22) Filed: May 30, 2018

(65) Prior Publication Data
US 2019/0370732 A1 Dec. 5, 2019

(51) Int. Cl.
G06Q 10/08 (2012.01)

(52) U.S. Cl.
CPC ....... *G06Q 10/087* (2013.01); *G06Q 10/0838* (2013.01); *G06Q 2220/00* (2013.01); *G06Q 2220/165* (2013.01)

(58) Field of Classification Search
None
See application file for complete search history.

(56) References Cited

U.S. PATENT DOCUMENTS

| | | | | |
|---|---|---|---|---|
| 10,102,526 B1* | 10/2018 | Madisetti | ............. | G06Q 20/389 |
| 2009/0254572 A1* | 10/2009 | Redlich | ................ | G06Q 10/107 |
| 2017/0046709 A1* | 2/2017 | Lee | ........................ | H04L 9/0891 |
| 2017/0206532 A1* | 7/2017 | Choi | ...................... | G06Q 30/02 |
| 2018/0117446 A1* | 5/2018 | Tran | ...................... | A42B 3/0433 |
| 2018/0117447 A1* | 5/2018 | Tran | ...................... | G06Q 20/382 |
| 2018/0191503 A1* | 7/2018 | Alwar | ........................ | H04L 9/14 |
| 2018/0264347 A1* | 9/2018 | Tran | ...................... | A63B 43/004 |
| 2018/0374173 A1* | 12/2018 | Chen | ...................... | G06Q 10/10 |
| 2019/0213462 A1* | 7/2019 | McDonald | ......... | G06Q 10/0833 |
| 2019/0349426 A1* | 11/2019 | Smith | ...................... | H04W 4/70 |
| 2020/0005290 A1* | 1/2020 | Madisetti | ............. | H04L 9/3239 |
| 2021/0073212 A1* | 3/2021 | Conley | ............. | G06Q 20/4014 |
| 2022/0021662 A1* | 1/2022 | Wright | ................... | G06Q 10/06 |

FOREIGN PATENT DOCUMENTS

| | | | | |
|---|---|---|---|---|
| CN | 110163628 A | * | 8/2019 | .......... G06Q 30/018 |
| CN | 110188243 A | * | 8/2019 | |
| CN | 107704493 B | * | 2/2021 | |

OTHER PUBLICATIONS

Secure and Efficient Product Information Retrieval in Cloud Computing (Year: 2018).*
S. Sicari et al. Security, privacy and trust in Internet of Things: The road ahead. Computer Networks 76, 2015, p. 146-164. https://www.idi.ntnu.no/emner/tdt49/p10-secpriv.pdf (Year: 2015).*

* cited by examiner

*Primary Examiner* — El Mehdi Oussir
(74) *Attorney, Agent, or Firm* — Schwegman, Lundberg & Woessner

(57) ABSTRACT

Multiple portions of information for a product are hashed to produce unique hash values during a journey of the product from production to purchase by a consumer. The hash values and information are stored in a cryptographic cooperatively shared product data structure. The hash values are subsequently submitted as product or portions of product searches to the cryptographic cooperatively shared product data structures and results are obtained for products associated with the portions of the information. The results are provided to services to drive proactive actions with respect to the product or other products related to any of the portions of information.

12 Claims, 4 Drawing Sheets

PRODUCT TRACEABILITY PROCESSING

BACKGROUND

A product may be handled by many different entities before it is ever purchased or acquired by a consumer. For example, produce originates with a grower, from the farm the produce is sent to a distributor, from the distributor the produce may be stopped at customs and boarder control, from customs the produce may be handled by a second distributor, from the second distributor the produce is sent to a retailer, and from the retailer it is purchased by a consumer. During the journey of the produce, many actions may be taken at the various entity locations, such as cleaning, disinfecting, inspecting, labeling, packaging, etc. The journey also involves transportation mechanisms, such ships, trucks, air cargo, etc.

The retailer has very little knowledge or information about a product's journey and much of the information that a retailer may have is likely outdated or available only on ordering and shipping invoices.

Consumers are becoming more and more conscious of the products that they purchase and are demanding more information, such as how was the product grown or manufactured, what location in the world did the product originate, what, if any, pesticides or hormones were used, who the entities are that provided the produce or poultry (given the growing social consciousness of consumers), etc.

Similarly, retailers are demanding more information about the journey of the products: to provide better information to their customers, to distinguish themselves from competitors in being able to provide such information, to better manage inventory, and to better manage promotions for products to improve on revenues and customer relationships with the retailers.

Presently, in the industry, there is not a mechanism by which product traceability of a product's lifecycle and journey are easily available to the retailers in an easy to integrate and cost effective manner.

SUMMARY

In various embodiments, methods and a system for product traceability processing are presented.

According to an embodiment, a method for product traceability processing is presented. More particularly, a hash is calculated from information relevant to a product. The hash is submitted as a search to a cooperatively shared data structure. Results are obtained in response to the search from the cooperative shared data structure. Finally, actions are driven with respect to the product based on the results.

DETAILED DESCRIPTION

Figure 1:
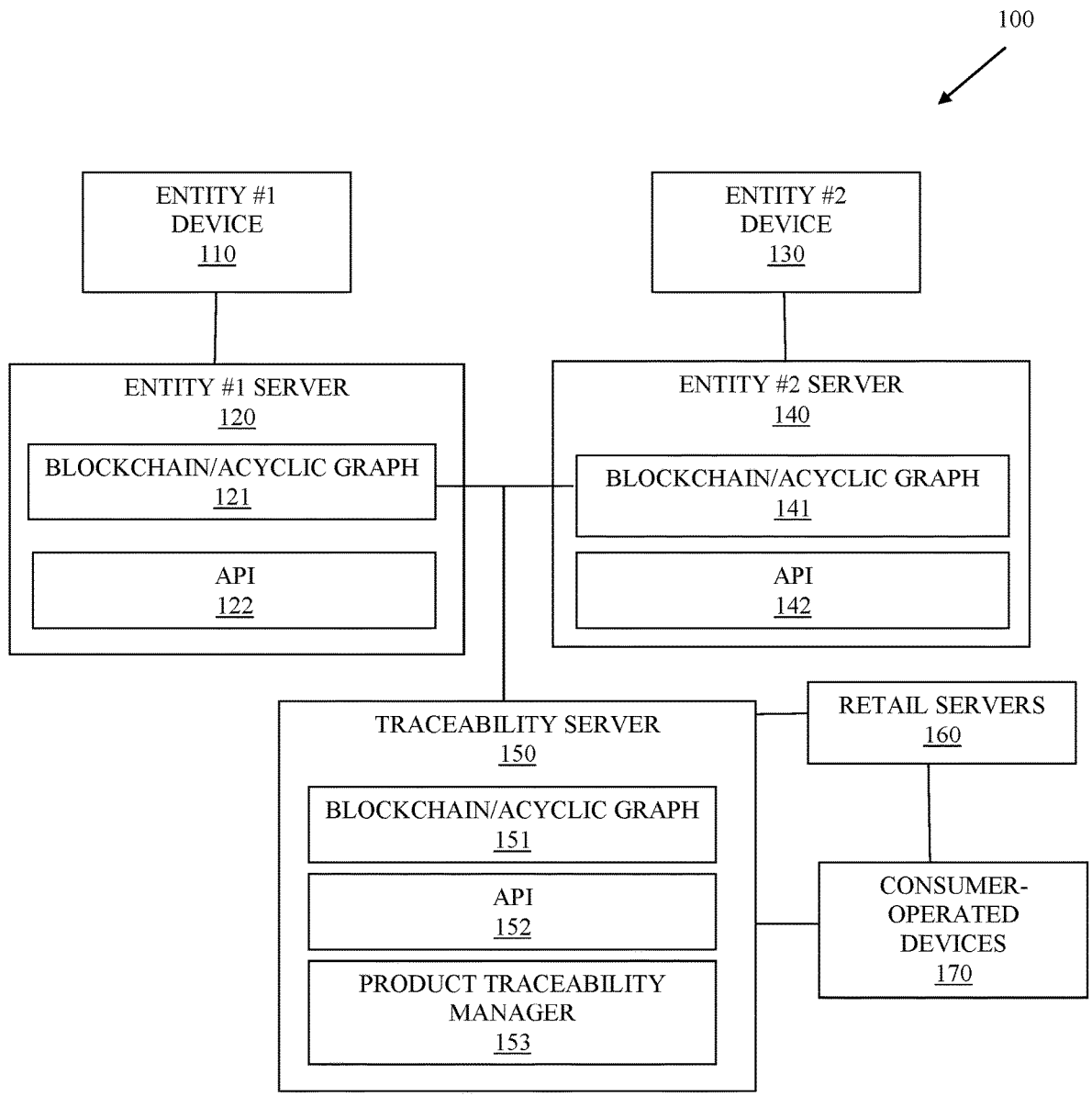
FIG. 1 is a diagram of a system product traceability processing, according to an example embodiment.

FIG. 1 is a diagram of a system 100 for product traceability processing, according to an example embodiment. The various components are illustrated and the arrangement of the components is presented for purposes of illustration only. It is to be noted that other arrangements with more or less components are possible without departing from the produce traceability teachings presented herein and below.

The techniques, methods, and system presented herein and below f product traceability processing can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," and "user" may be used synonymously and interchangeably.

The system 100 includes: a) a first entity (entity #1) device 110; b) an entity #1 server 120 having a Blockchain (BC)/Acyclic Graph (graph) 121, and an Application Programming Interface (API) 122; c) a second entity device (entity #2) 130; and an entity #2 server 140 having a BC/graph 141, and an API 142; d) a traceability server 150 having a BC/acyclic graph 151, an API 152, and a product traceability manager 153; one or more retail servers 160; and one or more consumer-operated devices 170.

When a product is handled and labeled, such as with a barcode, each entity that handles the product scans/enters the barcode (PLU code) for the product using devices 110 and 130. Additional information may also be collected that is custom supplied by each entity, such as and by way of example only, entity name, entity location, calendar day, time of day, entity relationship to the product (grower, manufacture, distributor, retailer, customs inspector, transporter, etc.), product expiration, if any, product origin, product ingredients, etc. Each entity may also enter notes about the product. Some of this information may be collected automatically by the APIs 122 and 142 and some of this information (such as notes) may be supplied to the APIs 122 and 142. Once the APIs 122 and 142 collect all of the available information for the product, the APIs 122 and 142 submit this information for inclusion to the BC/acyclic graphs 121 and 141 on their respective servers 120 and 140. The information can be configured based on the needs of entity. The product barcode or PLU along with other customized information, such as product origin, product ingredients, can be hashed into the BCs/acyclic graphs 121 and 141. That is multiple BC/acyclic graphs 121 and 141 can be created for each different aspect of the product that is desired to be traceable.

Some of the information submitted to the BC/graphs 121 and 141 is provided as hash values (barcode, PLU code, product origin, product ingredients, product expiration date,) for inclusion as hash values within the BC/graphs 121 and 141. Other portions of the information submitted to the BC/graphs 121 and 141 is provided in a text format for inclusion in the BC/graphs 121 and 141, such as any of the additional information supplied by each entity that was discussed above.

The APIs 122 and 142 include a common hashing algorithm for use with the barcode, PLU code, expiration date, origin, product ingredients, provided by entity devices 110 and 130. The APIs 122 and 142 process a cryptographically strong hashing algorithm on that information producing multiple unique hash values for uniquely identifying the product and uniquely identifying specific details of the product, such as expiration date, origin, product ingredients, etc. That is, a single product can generate multiple identifiable unique hash value entries for the product. The APIs 122 and 142 also obtain plaintext information for the produce, such as date and time, entity identifier, entity location, and any notes provided by each entity.

The hash value and plain text are provided by the APIs 122 and 142 to their BC/graphs 121 and 141, which are synchronized with one another through their servers 120 and 140. The hash values serves as keys for searching the BC/graphs 121 and 141. The BC/graphs 121 and 141 return in response to the search the plaintext associated with records in the BC/graphs 121 and 141.

The plaintext includes a traceability of the product from its origin through delivery to a consumer (at a retailer) and the plaintext representing a complete history for the product. That is, the retailer is one of the entities and it is to be understood that although only two entities are shown for illustration in the FIG. 1, there are in fact a plurality of multiple entities that handle the product on the product's journey to the consumer (when the consumer makes a purchase at a retailer).

The product traceability manager 153 provides an analysis and product tracking interface to retailer servers 160 and their promotion services, inventory control services, and customer/campaign services. These retail servers of the servers 160 interact with the product traceability manager 153 for searching the BC/acyclic graphs 121 and 141 for specific information. That is, the product traceability manager 153 provides a front-end search interface to the retailer services of the retailer servers 160.

This provides a variety of options to the retailer. For example, the retailer (though the retailer services and an API to the product traceability manager 153) can submit a search for obtaining a list of products having a particular origin. The product traceability manager 153 uses its API 152 to hash the particular origin and receives back all records for all products having that particular origin, which can then be provided back (through the API) to the requesting retailer service. The retailer service may then create customer-driven promotions based on the products returned.

As another example, a retailer service may request a list of products having specific ingredients or that have an organic compound. The product traceability manager 153 uses its API 152 to hash the ingredients or organic compound and searches the BC/acyclic graph 151 to obtain products with those ingredients or organic compound. This is provided back the requesting retailer service and the requesting retailer service can create promotions directed to specific-customers known to buy such ingredient-based or organic-compound based products.

In another case, a retailer service may request a specific product through its PLU. The API 152 hashes the PLU and searches the BC/acyclic graph 151 and receives back all information about such products including product expiration dates, which can be provided back to the requesting retailer service and the retailer service may create custom promotions to move those products having approaching expiration dates.

In another case, the retailer service may request a specific product through its PLU. The API 152 hashes the PLU and searches the BC/acyclic graph 152 and receives back production dates for a large inventor of the product associated with the PLU. This is provided to the retailer service, which may then create promotions in advance of the release of the production dates for the product.

In another scenario, the retailer service may request a PLU product search to discover demand or lack of supply for that product and create promotions of that product or a similar product (due to lack of supply).

In an embodiment, the retailer service may request a complete history and all notes on a specific product; this may be used as promotions for the specific product, such as proof that the product is environmentally and humanitarian friendly for social conscious customers of the retailer.

In fact, a plethora of scenarios are available and supported by the system 100 that hashes multiple aspects of a product into BC/acyclic graphs 121 and 141 and provides a retailer-based searching interface through the product traceability manager 153, such that retailers can custom define the types of information they want for promotional and inventory control purposes.

In an embodiment, the product traceability manager 153 provides an interface to consumers through consumer-operated devices 170.

In an embodiment, the retailer servers 160 provide an interface for accessing the product traceability manager 153 to the consumer-operated devices 170.

In an embodiment, the retailer services of the servers 160 send custom-created promotions directly to the consumers on their consumer-operated devices after discovering desired product traceability information from the product traceability manager 153.

In an embodiment, the consumer-operated devices include: phones, laptops, desktop computers, tablets, wearable processing devices, Internet-of-Things (IoT) devices, a Self-Service Terminal (SST) located at a retail establishment, and a Point-Of-Sale (POS) terminal located at a retail establishment.

These and other embodiments are now discussed with reference to the FIGS. 2-4.

Figure 2:
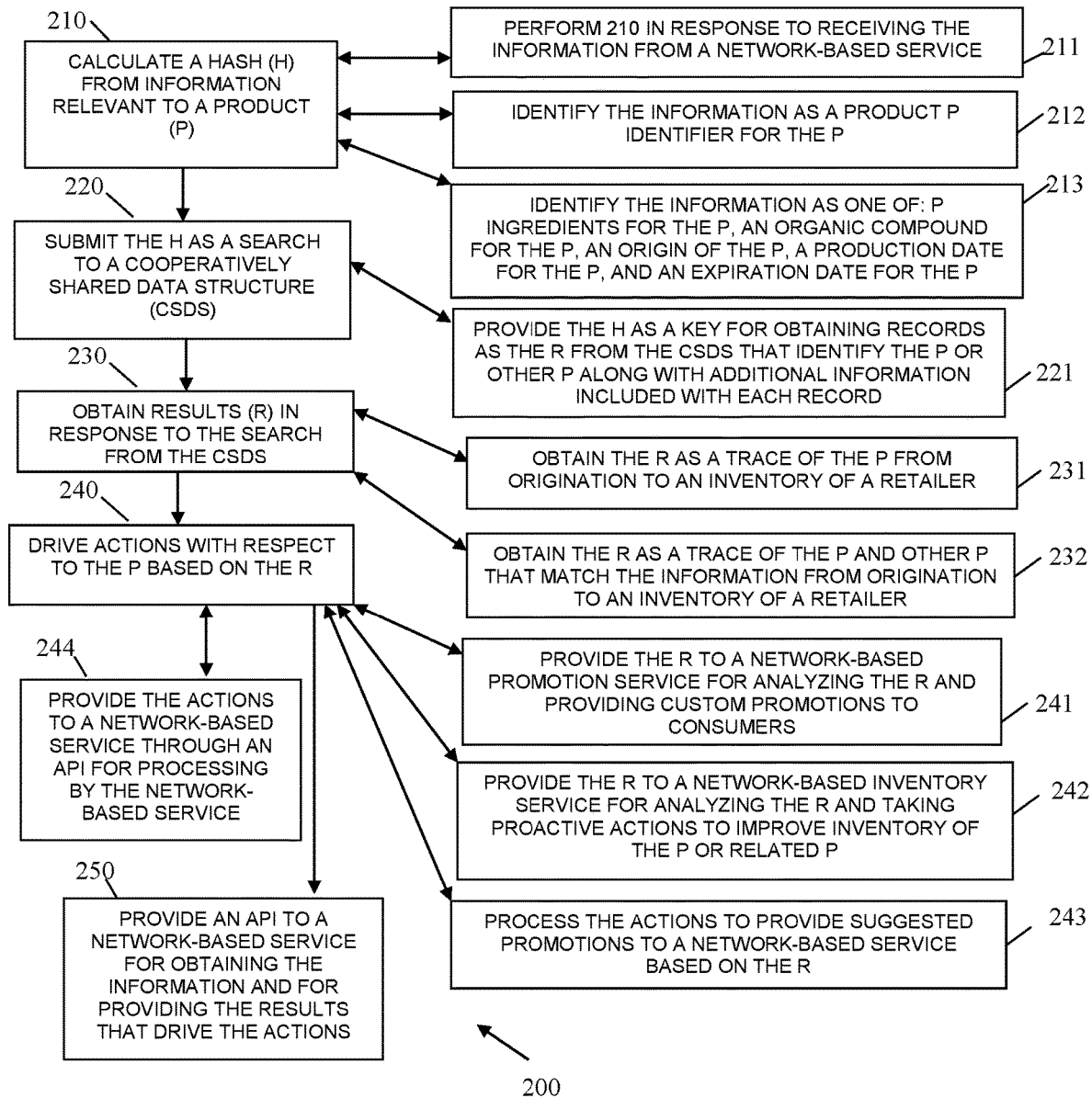
FIG. 2 is a diagram of a method product traceability processing, according to an example embodiment.

FIG. 2 is a diagram of a method for product traceability processing, according to an example embodiment. The software module(s) that implements the method 200 is referred to as a "product tracer." The product tracer is implemented as executable instructions programmed and residing within memory and/or a non-transitory computer-readable (processor-readable) storage medium and executed by one or more processors of a device. The processor(s) of the device that executes the product tracer are specifically configured and programmed to process the product tracer. The product tracer has access to one or more networks during its processing. The networks can be wired, wireless, or a combination of wired and wireless.

In an embodiment, the product tracer is all or some combination of the modules 151-153.

In an embodiment, the device that executes the product tracer is the server 150.

In an embodiment, the device that executes the product tracer is a plurality of servers logically organized as a cloud processing environment.

At 210, the product tracer calculates a hash from information relevant to a product. For example, information for a PLU, a barcode, product ingredients, product origin, product expiration date, produce production date, etc.

In an embodiment, at 211, the product tracer performs the calculating at 210 in response to receiving the information from a network-based service. In an embodiment, the network-based service is a retail service from a retail server 160.

In an embodiment, at 212, the product tracer identifies the information as a product identifier for the product (such as a PLU code or a barcode having a PLU code).

In an embodiment, at 213, the product tracer identifies the information as one of: product ingredients for the product, an organic compound for the product, an origin of the product, a production date for the product, and an expiration date for the product.

At 220, the product tracer submits the search to a cooperatively shared data structure. In an embodiment, the cooperative shared data structure is the BCs/acyclic graphs 121, 141, and 151.

In an embodiment, at 221, the product tracer provides the hash as a key for obtaining records as the results from the cooperative shared data structure. The records identify the product or other products along with additional information included with each record.

At 230, the product tracer obtains the results in response to the search from the cooperatively shared data structure.

In an embodiment, at 231, the product tracer obtains the results as a trace of the product from origination to an inventory of a retailer.

In an embodiment, at 232, the product tracer obtains the results as a trace of the product and other products that match the information from origination to an inventory of a retailer.

At 240, the product tracer drives actions for processing with respect to the product based on the results.

In an embodiment, at 241, the product tracer provides the results to a network-based promotion service for analyzing the results and providing custom promotions as the actions to consumers.

In an embodiment, at 242, the product tracer provides the results to a network-based inventory service for analyzing the results and taking proactive actions to improve inventory of the product or related products.

In an embodiment, at 243, the product tracer processes the actions to provide suggested promotions to a network-based service based on the results.

In an embodiment, at 244, the product tracer provides the actions to a network-based service through an API for processing by the network-based service.

According to an embodiment, at 250, the product tracer provides an API to a network-based service for obtaining the information (at 210) and for providing the results that drive the actions (at 240).

Figure 3:
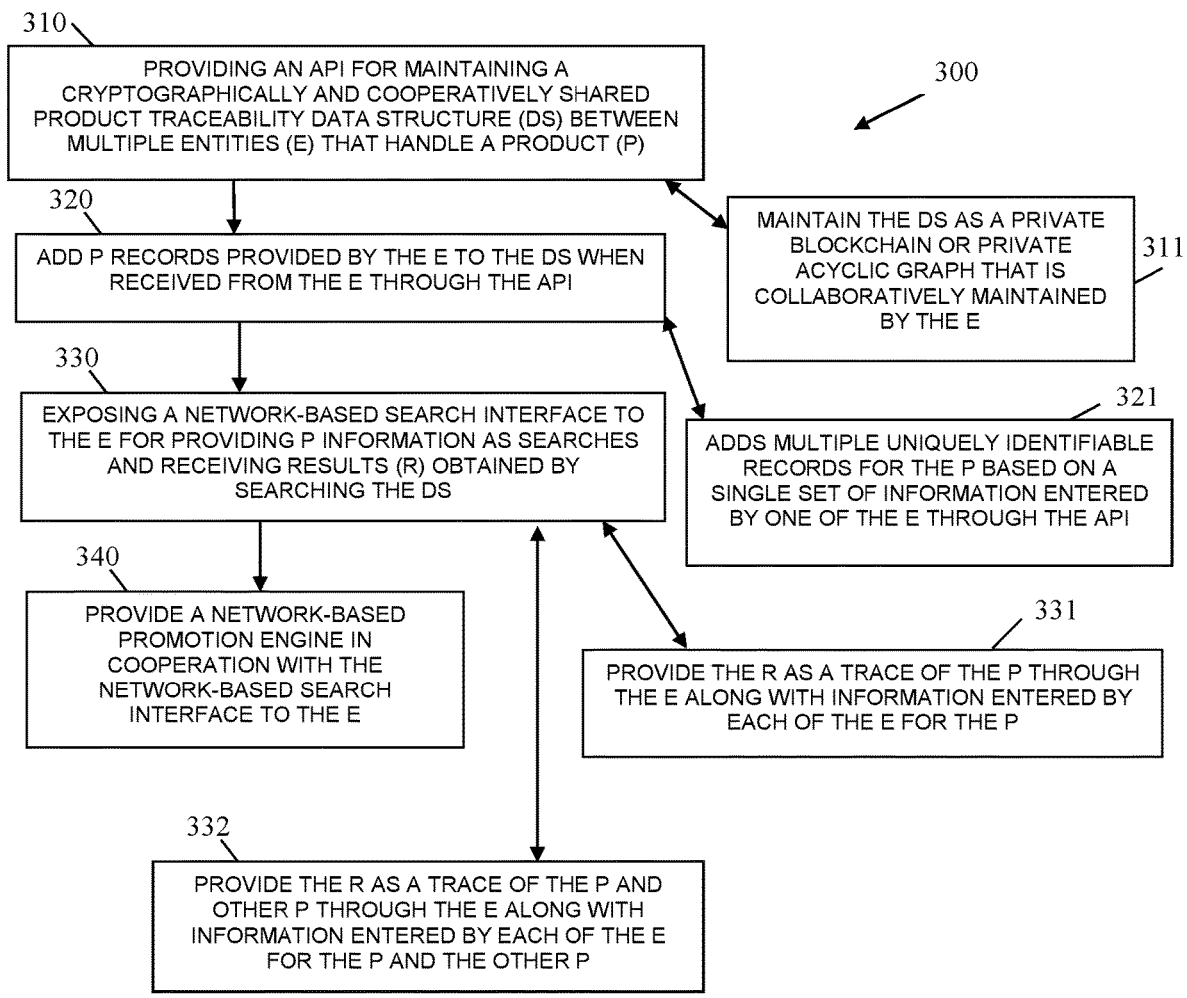
FIG. 3 is a diagram of another method product traceability processing, according to an example embodiment.

FIG. 3 is a diagram of another method for product traceability processing, according to an example embodiment. The software module(s) that implement the method 300 is referred to herein as a "product tracer search engine." The product tracer search engine is implemented as executable instructions and programmed within memory and/or a non-transitory computer-readable (processor-readable) storage medium that executes on one or more processors of a device. The processors of the device are specifically configured to execute the product tracer search engine. The product tracer search engine has access one or more networks; the networks can be wired, wireless, or a combination of wired and wireless.

In an embodiment, the product tracer search engine is all or some combination of the software modules 151-153, and/or the method 200.

In an embodiment, the device that executes the product tracer search engine is the server 150.

In an embodiment, the device that executes the product tracer search engine is a plurality of servers logically cooperating as a cloud processing environment.

The product tracer search engine presents another and in some ways processing perspective from that which was presented above in the method 200 of the FIG. 2.

In an embodiment, the product tracer search engine is provided as a Software-as-a-Service (SaaS) to the retail servers 160.

At 310, the product tracer search engine provides an API for maintaining a cryptographic and cooperatively shared product traceability data structure between multiple entities that handle a product during a journey of that product from production to inventory with a retailer.

In an embodiment, at 311, the product tracer search engine maintains the data structure as a private blockchain or private acyclic graph that is collaboratively maintained by the entities.

In an embodiment, the data structure is the BCs/acyclic graphs 121, 141, and 151.

At 320, the product tracer search engine adds product records provided by the entities to the data structure when received from the entities through the API.

In an embodiment, at 321, the product tracer search engine adds multiple uniquely identifiable records for the product based on a single set of information entered by one of the entities through the API. For example, uniquely identifiable records for product PLU, product origin, product ingredients, product organic compound, product production date, and product expiration date.

At 330, the product tracer search engine exposes a network-based search interface to the entities for providing information as searches and for receiving results obtained by searching the data structure.

In an embodiment, at 331, the product tracer search engine provides the results as a trace of the product through the entities along with information entered by each of the entities for the product.

In an embodiment, at 332, the product tracer search engine provides the results as a trace of the product and other products through the entities along with information entered by each of the entities for the product and the other products.

According to an embodiment, at 340, the product tracer search engine provides a network-based promotion engine in cooperation with the network-based search interface to the entities.

Figure 4:
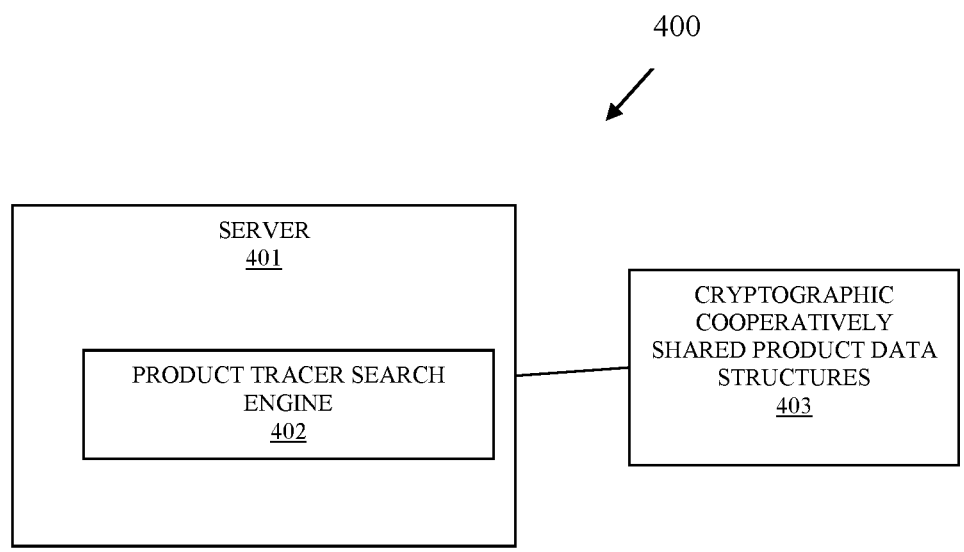
FIG. 4 is a diagram of another system product traceability processing, according to an example embodiment.

FIG. 4 is a diagram of another system 400 for product traceability processing, according to an example embodiment. The components of the system 400 are programmed and reside within memory and/or a non-transitory computer-readable medium and execute on one or more processors of the devices of the system 400. The system 400 also has access and can communicate over one or more networks; and the networks can be wired, wireless, or a combination of wired and wireless.

The system 400 is configured and programmed to perform the processing discussed above with the FIGS. 1-3.

The system 400 includes a server 401 having product tracer search engine 402 and a plurality of cryptographic cooperatively shared product data structures 403.

In an embodiment, the server 401 is the server 120/server 150.

In an embodiment, the server 401 is a part of a cloud processing environment.

The product tracer search engine 402 executes on at least one hardware processor of the server 401 and is configured to: i) execute on at least one hardware processor of the server 401, ii) maintain the cryptographic cooperatively shared product data structures 402 between multiple entities that handle a product, and iii) search the cryptographic cooperatively shared product data structures 402 in real time for taking actions related to the product or other products.

In an embodiment, the product tracer search engine 402 is further configured to: iv) make promotions recommendations to the entities based on searches submitted by the entities to the product tracer search engine.

In an embodiment, the product tracer search engine 402 performs some or all of the processing discussed above for the software modules 121-122, 141-142, 151-153, the method 200, and/or the method 300.

In an embodiment, the cryptographic cooperatively shared product data structures are the BC/graphs 121, 141, and 151.

In an embodiment, the cryptographic cooperatively shared product data structures are private BCs or private acyclic graphs that the merchants subscribe to and that provides authentication for access to the cryptographic cooperatively shared product data structure.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    obtaining and executing, by a server processor executable instructions from a server non-transitory computer-readable storage medium causing the server processor to perform operations comprising:
        receiving a search from a network-based service, wherein the search identifies information for the search and the information at least comprises a product identifier for a product;
        calculating a hash from at least the product identifier of the information;
        submitting the hash as the search to a cooperatively shared data structure using a blockchain Application Programming Interface (API), wherein the cooperative shared data structure is a blockchain;
        obtaining results in response to the search from the cooperative shared data structure through the blockchain API;
        driving actions taken with respect to the product based on the results by promotion services, inventory control services, or customer services associated with the network-based service; and
        providing and maintaining the cooperatively shared data structure as a product tracer and tracker of the product for each entity that handled the product from origination to a store delivery.

2. The method of claim 1, wherein calculating further includes identifying the information as one of: product ingredients for the product, an organic compound for the product, an origin of the product, a production date for the product, and an expiration date for the product.

3. The method of claim 1, wherein submitting further includes providing the hash as a key for obtaining records as the results from the cooperatively shared data structure that identify the product or other products along with additional information included with each record.

4. The method of claim 1, obtaining further includes obtaining the results as a trace of the product from the origination to an inventory of the store.

5. The method of claim 1, obtaining further includes obtaining the results as a trace of product and other products that match the information from the origination to an inventory of the store.

6. The method of claim 1, wherein driving further includes providing the results to a second network-based promotion service associated with the promotion services for analyzing the results and providing custom promotions to consumers.

7. The method of claim 1, wherein driving further includes providing the results to a second network-based inventory server associated with the inventory services for analyzing the results and taking proactive actions to improve inventory of the product or related products.

8. The method of claim 1, wherein driving further includes processing the actions to provide suggested promotions to a second network-based service associated with the customer services based on the results.

9. The method of claim 1, wherein driving further includes providing the actions to the second network-based service through a second API for processing by the second network-based service.

10. The method of claim 9 further comprising, providing a third API to the network-based service for obtaining the information and for providing the results that drive the actions.

11. A system, comprising:
    a server comprising a server processor and a server non-transitory computer-readable storage medium;
    the server non-transitory computer-readable storage medium comprises server executable instructions;
    cryptographic cooperatively shared product data structures, wherein each cryptographic cooperatively shared product data structure corresponding to a particular product; and
    the server executable instructions obtained and executed by the server processor causing the server processor to perform operations comprising:
        maintaining the cryptographic cooperatively shared product data structures between multiple entities that handle products within a blockchain;
        receiving a search from a network-based service, wherein the search identifies information for the search and the information at least comprises a product identifier for a particular product;

calculating a hash from at least the product identifier of the information;

searching the cryptographic cooperatively shared product data structures using the hash in real time for taking one or more actions related to the particular product using a blockchain Application Programming Interface (API), wherein the one or more actions are processed by promotion services, inventory services, or customer services associated with the network-based service;

managing the cooperatively shared product data structure as a product tracer and tracker of the products for each entity that handled the products from originations to store deliveries using the network-based service.

12. The system of claim 11, the executable instructions obtained and executed by the processor further causing the processor to perform additional operations comprising:

generating and providing promotion recommendations to the entities based on results of the search or other searches associated with the products and submitted by the entities to a product tracer search engine, wherein the network-based service is the product tracer engine.

\* \* \* \* \*